(12) United States Patent
Hoemann et al.

(10) Patent No.: US 7,692,350 B2
(45) Date of Patent: Apr. 6, 2010

(54) HORIZONTAL AXIS WASHING MACHINE HAVING 4 POLE 36 SLOT MOTOR

(75) Inventors: Keith I. Hoemann, Fenton, MO (US); Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 395 days.

(21) Appl. No.: 11/680,330

(22) Filed: Feb. 28, 2007

(65) Prior Publication Data

US 2008/0203846 A1     Aug. 28, 2008

(51) Int. Cl.
*H02K 3/00* (2006.01)
(52) U.S. Cl. .............. 310/166; 310/211; 310/216.075
(58) Field of Classification Search .......... 310/216.028, 310/216.055–216.071, 216.095–216.097, 310/211, 166, 179–180, 216.074–216.075, 310/216.111
See application file for complete search history.

(56) References Cited

U.S. PATENT DOCUMENTS

| | | | |
|---|---|---|---|
| 2,528,154 A * | 10/1950 | Ludwig et al. ............... 310/211 |
| 3,778,652 A * | 12/1973 | Endress ....................... 310/211 |
| 4,241,274 A | 12/1980 | Brammerlo | |
| 4,566,179 A * | 1/1986 | Sawyer et al. ................. 29/596 |
| RE34,667 E | 7/1994 | Neumann | |
| 5,998,904 A * | 12/1999 | Hattori ................. 310/216.071 |
| 6,181,047 B1 | 1/2001 | Nitta | |
| 6,285,104 B1 * | 9/2001 | Nashiki ....................... 310/184 |
| 6,946,760 B2 | 9/2005 | Crapo et al. | |
| 2006/0244331 A1 | 11/2006 | Groening | |

OTHER PUBLICATIONS

Written Opinion of the International Searching Authority, International Application No. PCT/US08/52262, dated Jul. 8, 2008, 6 pgs.

* cited by examiner

*Primary Examiner*—Tran N Nguyen
(74) *Attorney, Agent, or Firm*—Senniger Powers LLP

(57) ABSTRACT

A horizontal axis washing machine includes a clothing receptacle rotated by a 4 pole rotor. A 36 slot stator having an interior bore with an interior diameter receives the 4 pole rotor in magnetic coupling relation and capable of operating within a flux weakening range of at least 5:1. The stator has a ratio of an interior diameter to a minimum exterior diameter greater than or equal to 0.63:1.

21 Claims, 4 Drawing Sheets

HORIZONTAL AXIS WASHING MACHINE HAVING 4 POLE 36 SLOT MOTOR

FIELD OF THE INVENTION

The present invention generally relates to controlled induction motors (CIM) or brushless permanent magnet (BPM) motors. In particular, the invention relates to such CIM and BPM motors for us in front load, horizontal axis washing (HAW) machines.

BACKGROUND OF THE INVENTION

Motors for HAW machines typically require a high speed range in order to drive both the wash cycle and the spin cycle of a washing machine. In particular, such motors usually operate over a wide speed range of approximately 30 to 1. During the wash cycle, the motor operates at a low speed typically in the range of 400-800 rpms with high torque. During the spin cycle, the motor operates at a high speed, typically in the range of 12,000-18,000 rpms with low torque. Many CIMs in HAW machines operate in a wide speed range of 500 rpms-18000 rpms, representing a flux weakening range of 5 or more.

In the range of motors with stators having a diameter equal to or less than 6.3 inches, several combinations of poles and slots are used to accomplish the necessary field weakening range required for HAW machines. For example, such motors have been implemented as 2 pole, 24 slot CIMs.

Although 2P/24S CIMs may be designed to meet the wide speed range requirements of HAW machines, the 2P/24S CIMs are larger than desired, having higher stator end turns and increased material costs. There is a need for a wide speed CIM or BPM motor having a smaller configuration to accommodate lower stator end turns and to provide reduced material costs in a more compact motor design.

In industrial range motors having stator outside diameters in the range of 5.5 inches to 6.3 inches, 4 pole, 36 slot motors have been used. However, such industrial range motors have not been known to be used for flux weakening ranges of about 5 or more. In addition, such motors have been observed to ID/minimum OD ratios (e.g., inside diameter/diameter across flats) to be less than 0.63. For various reasons, such motors have not been employed in HAW machines as unsuitable to meet the drive, weight and size requirements.

SUMMARY OF THE INVENTION

In one form, the invention is a 4 pole, 36 slot motor. In one embodiment, the rotor of the motor includes bars which are exposed at a periphery of the rotor. In another embodiment, the motor has a controller operating the motor in a flux weakening range of at least 5:1. In another embodiment, the stator of the motor has an interior/exterior diameter of 0.63:1 or more. In another embodiment, the motor drives a clothing receptacle of a washing machine on a horizontal axis. In another embodiment, the motor is a controlled induction motor or an internal permanent magnet motor. In another embodiment, the stator of the motor has aluminum windings. In another embodiment, the motor operates from less than 600 rpms to at least 14000 rpms. In another embodiment, the 4 pole, 36 slot motor has a drive control for a 2 pole, 24 slot motor wherein the drive control has a different frequency of operation for the 4/36 motor as compared to the frequency of operation for the 2/24 motor.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
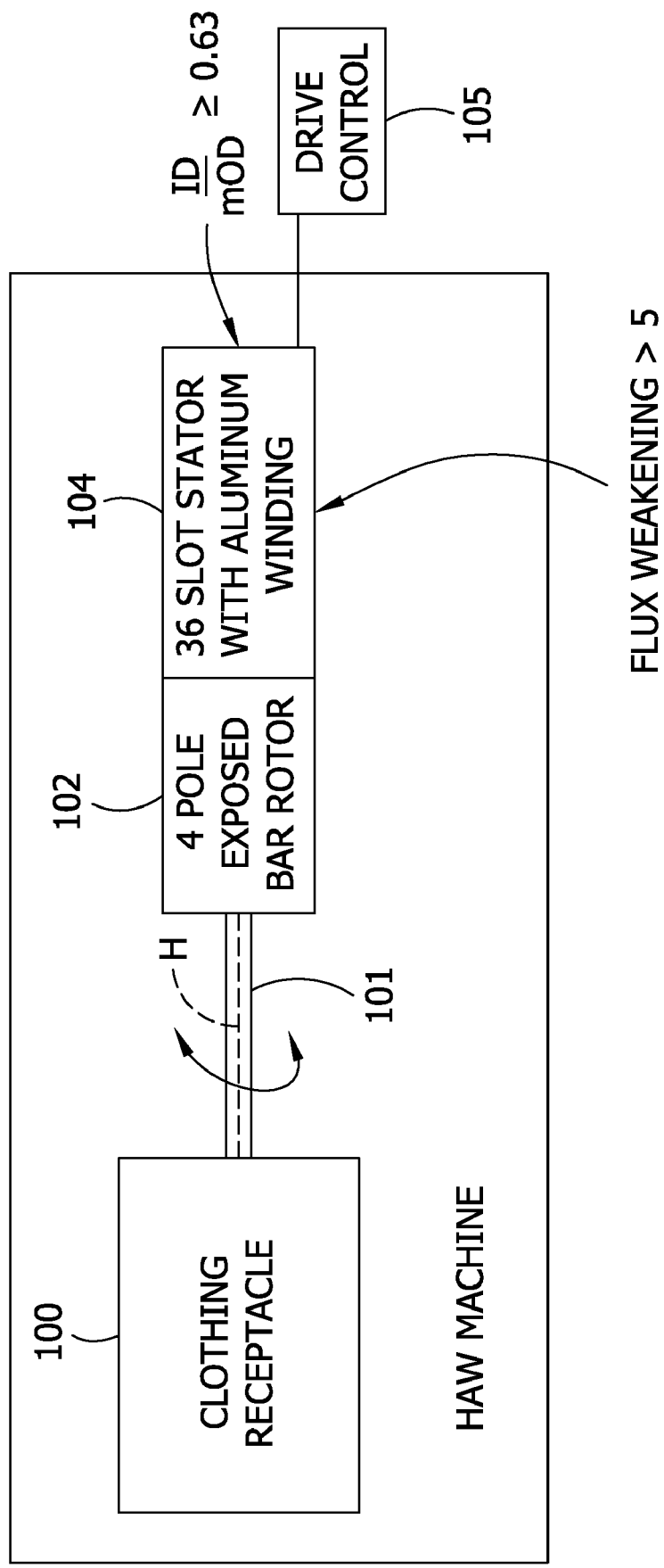
FIG. 1 is a block diagram of a horizontal axis washing (HAW) machine having a clothing receptacle driven by a 4 pole, 36 slot motor, according to one embodiment of the invention.

In one embodiment, the present invention addresses the preference to a 4 pole motor design which allows for lower stator end turns, thereby reducing material costs and providing a more compact motor. On the other hand, the currents required for a given load tend to be too high in the 4 pole/24 slot motor design over the 5:1 flux weakening range required for HAW performance.

In one embodiment, the invention overcomes the high current problem, and provides other advantages, by providing a motor having a combination of features producing an unexpected, synergistic result. For example, the combination of a 4 pole rotor having exposed bars (particularly the CIM version) with a 36 slot stator having an inner diameter (ID)/ minimum outer diameter (mOD) ratio greater than 0.63 accommodates a flux weakening range of 5 to 1 or greater. This diameter ratio also results in providing a low level leakage path with about 20% flux loss. In addition, such a combination may optionally include aluminum wire windings because of reduced stator cross-sectional area and larger slot area (e.g., reduced as compared to a 2P/24S motor). In one embodiment, flux saturation is a function of the volts to frequency (hertz) ratio so that flux weakening can be accomplished by increasing the voltage or decreasing the frequency (hertz).

According to various embodiments of the invention, a 4 pole, 36 slot configuration provides advantages over a 2 pole design for motors for driving HAW machines, which motors operate in a flux weakening range of at least 5:1. For example, in one embodiment, the windings of a 36 slot stator have shorter endturns than a 24 slot configuration due to the shorter span of the coils. This results in less endturn wire weight and less mean length of the turns. Thus, wire weight is reduced which means less resistance within the windings thereby reducing wire watt losses. Also, 36 slots as compared to 24 slots increases the slot periphery so that more surface area of the windings are in contact with the rotor permitting reduced wire weight. Accordingly, a 4 pole, 36 slot configuration tends to be more efficient than a 2 pole, 24 slot configuration and provides a more cost efficient design. However, if the ID/OD for the 4P/36S configuration is the same as the ID/OD for the 2P/24S configuration, the 4P/36S configuration would have greater current requirements in order to drive the motor over the 5:1 flux weakening range. This requires more demanding electronics to handle the additional currents resulting in a more costly motor control cost to accomplish the speed range.

It has been found that the 4P/36S configuration according to various embodiments of the invention has a high magnetizing resistance and reduces the currents over the speed range. The 36 slots also reduce the thermal resistance between the winding wires and the slot periphery. The result is a cooler motor and the option of using less copper wire or using aluminum wire for the same overall temperature rise. In addition, the 4P/36S configuration has substantially the same current requirements as compared to a 2 pole/24 slot configuration. Although the current requirements are not significantly different, the frequency of operation is different because of the different number of poles and slots.

It has also been found that a ID/minimum OD of greater than 0.63 also improves magnetizing resistance and reduces currents over the speed range. The larger bore compared to the minimum OD results in higher torque density so that the motor is smaller and less costly. In addition, the stack length of the laminations of the stator can be reduced while maintaining the speed range and flux weakening requirements. The reduced stack length translates into reduced weight, reduced labor and material costs, reduced size of counterbalancing weights and reduced shipping costs.

In general, a 4 pole motor as compared to a 2 pole motor in the same lamination configuration would have a lower magnetizing reactance, reducing the power factor and increasing current requirement for a given load, especially at lower frequencies where the ratio of magnetizing reactance to rotor resistance is small. According to embodiments of the inventions, the magnetizing reactance is increased by employing a 36 slot stator. This results in a lower electrical skew angle since the stator pitch is smaller. The lower skew angle increases the magnetizing reactance. In addition, according to embodiments of the inventions, the magnetizing reactance is increased by employing an exposed bar rotor (also referred to as an open bar rotor or a broken bar rotor). Exposing the rotor bars reduces the stator and rotor reactance at higher speeds which increases the torque produced at a given voltage thereby reducing current requirements. In addition, it is contemplated that turns can be added to the winding to weaken the motor at higher speeds to increase the magnetizing reactance. In addition, it has also been found that the exposed rotor bars reduce cogging.

Figure 3:
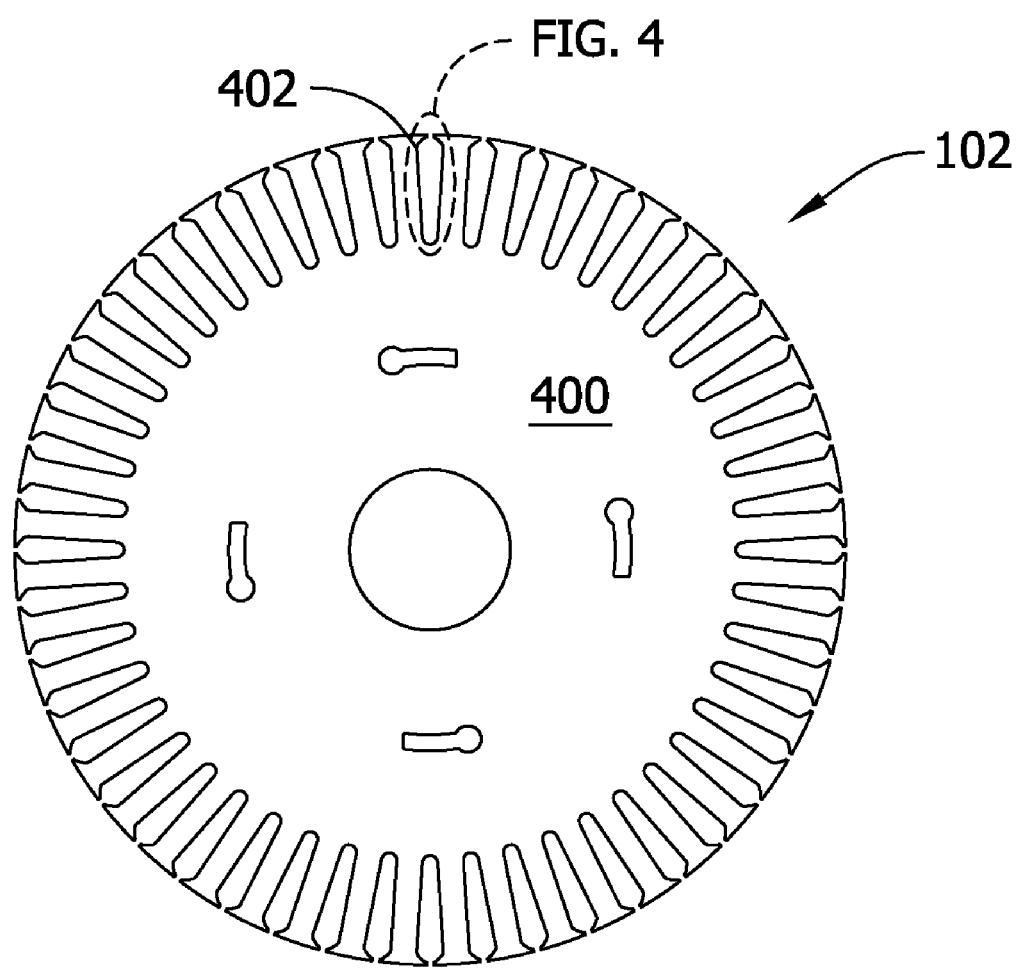
FIG. 3 is a cross sectional view of one embodiment of a rotor lamination according to the invention.

In one embodiment of the invention as illustrated in FIG. 1, a horizontal axis washing (HAW) machine comprises a clothing receptacle 100 supported for rotation about a horizontal axis H. A motor for driving the clothing receptacle comprises a 4 pole rotor 102, an exemplary design of which is illustrated in FIG. 3, and a 36 slot stator 104 with windings energized by a drive control 105. The 4 pole rotor is connected to the clothing receptacle, such as by a drive shaft 101, to rotate the clothing receptacle 100 about the horizontal axis.

Figure 2:
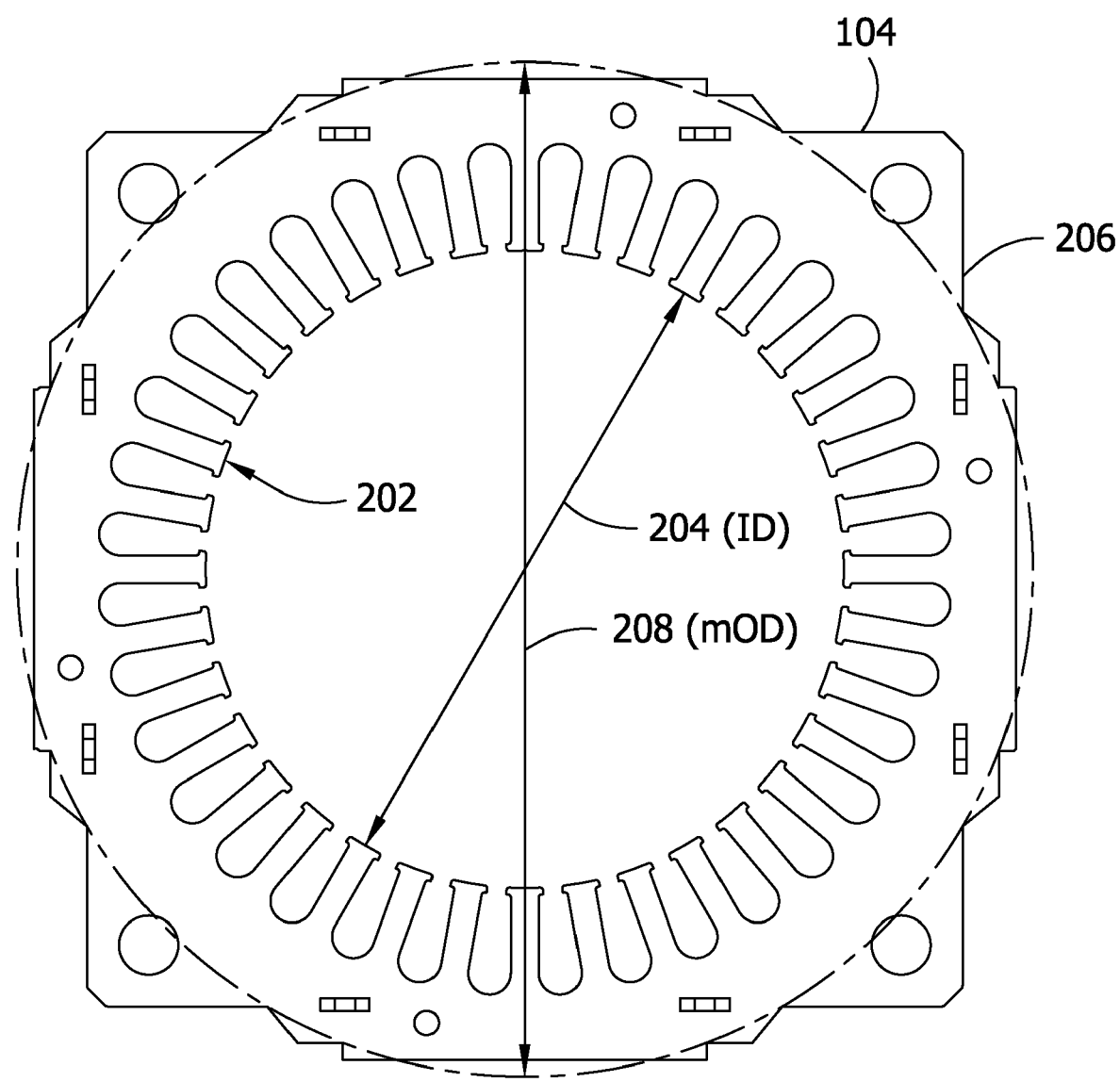
FIG. 2 is a cross sectional view of one embodiment of a stator lamination according to the invention.

The stator 104, an exemplary design of which is illustrated in FIG. 2, is configured to have an interior bore 202 with an interior diameter 204. The interior bore 202 receives the 4 pole rotor 102 in magnetic coupling relation to the windings of the 36 slot stator 104. When energized, the windings cause the rotor 102 to rotate about the horizontal axis H at various speeds in a clockwise and/or counterclockwise direction to agitate and/or spin the clothing receptacle 100.

The stator 104 has an exterior perimeter 206 with a minimum exterior diameter 208. The minimum exterior diameter is the minimum when considering all diameters of the exterior periphery of the stator. A ratio of the interior diameter 204 to the minimum exterior diameter 208 is greater than or equal to 0.63:1, thus configuring the motor to operate with a flux weakening range of at least 5:1.

Figure 4:
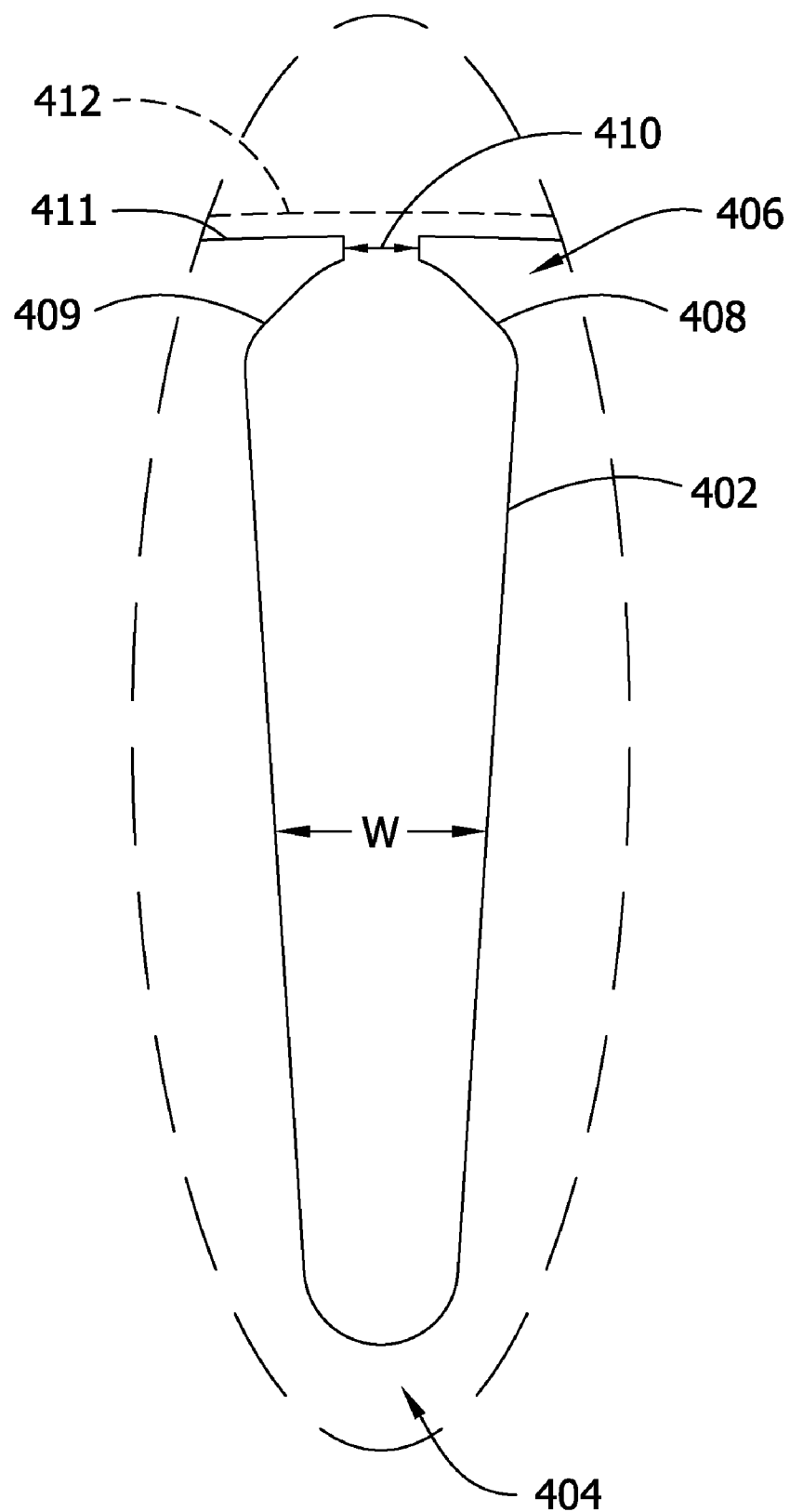
FIG. 4 is a partial, cross sectional, exploded view of one embodiment of a slot of the rotor lamination of FIG. 3 according to the invention.

In one optional embodiment, the rotor 102 includes bars which are exposed at a periphery of the rotor. As noted above, the resulting reduced rotor reactance at higher speeds increases the torque produced at a given voltage. FIG. 3 illustrates one embodiment of a rotor lamination 400 according to the invention including optional exposed bars 402, which are illustrated in more detail in FIG. 4. In this embodiment, the bars 402 are tapered and reduce is width W toward the center of the lamination 400. Each end 404, 406 has a radius and the wider end 406 facing the periphery has shoulders 408 and 409 which terminate in a neck 410. Other embodiments of various shapes and configurations of the bars 402 are contemplated. In one embodiment, it is contemplated that the initial lamination extend beyond a periphery 411 so that the initial periphery of the lamination 402 is as indicated by dashed line 412, forming closed bars 402 which are not exposed. After assembly of the laminations 400 and insertion of the bars 402 within the assembled laminations, the periphery of the rotor 412 is machined to remove the portion of the periphery between 410 and 412, thus exposing the neck of the rotor bars 402.

In one optional embodiment, the ratio of the interior diameter 204 to minimum exterior diameter 208 of the 36 pole stator is about 0.63:1 or greater (e.g. 0.65:1). This increased ratio of the stator diameter means that the motor has reduced materials and operates at reduced temperatures at lower speeds because of lower currents as compared to a motor having a ratio of an interior diameter to an exterior diameter of less than 0.63:1. In one embodiment, the minimum exterior diameter 208 of the 36 slot stator is about 120 millimeters, the interior diameter 204 is about 78 mm and the stator laminations have a height of about 40 millimeters.

Table 1 illustrates operation of one embodiment of 4 pole, 36 slot (4P/36S) motor of the invention as compared to operation of a 2 pole, 24 slot (2P/24S) motor of the prior art. As illustrated in Table 1, below, in one embodiment the 4 pole, 36 slot (4P/36S) motor of the invention has reduced temperature of operation and lower current than a 2 pole, 24 slot (2P/24S) motor having a size of about 132 mm in diameter and about 60 mm in height. For example, Table 1 shows that the 4P/36S motor operates at a lower wattage and has a higher efficiency at 540 rpms as compared to the 2P/24S motor while producing the same torque. Table 1 also shows that the 4P/36S motor operates at substantially the same wattage and efficiency at 540 rpms as compared to the 2P/24S motor.

TABLE 1

|  | 2P/24S | 4P/36S | 2P/24S | 4P/36S |
| --- | --- | --- | --- | --- |
| Speed (rpm) | 540 | 540 | 16200 | 16200 |
| Torque (Nm) | 1.85 | 1.85 | 0.285 | 0.285 |
| Freq (Hz) | 11.40 | 20.45 | 285.00 | 556.00 |
| Watts | 216.1 | 204.8 | 678.2 | 678.6 |
| Shaft watts | 104.7 | 104.83 | 483.8 | 483.8 |
| Avg Volts$_{rms}$ | 48.90 | 47.27 | 191.77 | 194.42 |
| Avg Amps$_{rms}$ | 2.83 | 2.90 | 2.42 | 2.39 |
| Eff (%) | 48.4 | 51.2 | 71.3 | 71.3 |
| PF (%) | 90.3 | 86.4 | 84.4 | 84.3 |
| V/Hz | 4.29 | 2.31 | 0.67 | 0.35 |

It is contemplated that the motor may be a controlled induction motor (CIM) or an internal permanent magnet (IPM) motor. As noted above, in one optional embodiment the stator may have aluminum windings. The IPM is a buried magnet rotor whereas the CIM has a conductive cage such as an aluminum or copper cage. The IPM is a synchronous motor whereas the CIM is an asynchronous motor. The higher rotor diameter to stator results in at least two advantages for the IPM: a higher lmax/lmin ratio and higher flux level, due in part to the increased size of magnets. The higher lmax/lmin improves the reluctance torque available both at low and high speed operation. The torque generated by the magnets is greater due to the higher flux of the larger magnets. The 36 slot configuration reduces the lmax and lmin for a given bemf (back emf) of the motor over a 24 slot configuration. Lower inductance reduces the reactance at high speed making it easier to drive AC phase current into the motor.

In one embodiment, during a spin cycle the stator 104 is energized by the drive control 105 to rotate the rotor 102 to drive the clothing receptacle 100 about horizontal axis H at a speed of at least 14000 rpms and during a wash cycle the stator 104 is energized by the drive control 105 to rotate the rotor 102 to drive the clothing receptacle 100 at a speed of less than 600 rpms. This would mean that the drive control is operating the motor in a flux weakening range of about 6:1.

Table 1 illustrates that at least one embodiment of the 4P/36S motor of the invention has substantially the same operating parameters as a 2P\24S motor of the prior art. Thus, the drive control 105 for the 4P/36S motor may have substantially the same current and voltage ratings as a drive control for a 24 slot 2 pole motor. In operation, the drive control 105 for the 4P/36S motor of the invention would have a different frequency of operation because of the different number of poles and slots.

Having described the invention in detail, it will be apparent that modifications and variations are possible without departing from the scope of the invention defined in the appended claims.

For example, the invention also includes a method of making a washing machine comprising:
(1) producing the 4 pole rotor 102, such as by stacking laminations 400, inserting bars 402 and machining the periphery 411 of the rotor 102 to expose the neck 410 of the bars 402;
(2) producing the 36 slot stator 104 such as by stacking stator laminations having an interior aperture 202 with an interior diameter, said stator laminations having a minimum exterior diameter with a minimum exterior diameter wherein a ratio of the interior diameter to the minimum exterior diameter is at least 0.63, the stator having aluminum windings;
(3) inserting the 4 pole rotor 102 into the aperture 202 so that the 4 pole rotor is in magnetic coupling relation to the 36 slot stator 104 when the windings are energized by the drive control 105; and
(4) connecting the rotor 102 to a horizontally rotatable clothing receptacle.

Optionally, the method of producing the 4 pole rotor 102 may include stacking laminations 400, inserting bars 402 and machining the periphery 411 of the rotor 102 to expose the neck 410 of the bars 402.

Optionally, the method may configure a controlled induction motor (CIM) or an internal permanent magnet (IPM) motor.

In another embodiment, the motor of the invention comprises the 4 pole rotor 104 including bars 402 which are exposed at a periphery of the rotor 104 in combination with a 36 slot stator 104 operable in a flux weakening range of at least 5:1.

EXAMPLES

The following non-limiting examples are provided to further illustrate the present invention.

According to one embodiment of the invention, it has been found that a 4 pole/36 slot configuration having an ID/minimum OD of greater than 0.63 accommodates a flux weakening range of at least 5:1 without significantly different current requirements as compared to a 2 pole/24 slot configuration.

According to another embodiment of the invention, it has been found that a 4 pole/36 slot configuration having exposed rotor bars accommodates a flux weakening range of at least 5:1 without significantly different current requirements as compared to a 2 pole/24 slot configuration.

According to one embodiment of the invention, it has been found that a 4 pole/36 slot configuration having an ID/minimum OD of greater than 0.63 and having exposed rotor bars accommodates a flux weakening range of at least 5:1 without significantly different current requirements as compared to a 2 pole/24 slot configuration.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A washing machine comprising:
A clothing receptacle supported for rotation about a horizontal axis; and
A motor comprising:
A 4 pole rotor connected to the clothing receptacle to rotate the clothing receptacle about the horizontal axis;
A 36 slot stator having an interior bore with an interior diameter, said interior bore receiving the 4 pole rotor in magnetic coupling relation to the 36 slot stator, said stator having an exterior perimeter with a minimum exterior diameter wherein a ratio of the interior diameter to the minimum exterior diameter is about 0.63:1 or greater wherein the motor is capable of operating in a flux weakening range of at least 5:1 thereby configuring the motor having reduced materials, reduced temperature of operation at lower speeds and lower current than a motor having a ratio of an interior diameter to an exterior diameter of less than 0.63:1.

2. The machine of claim 1 wherein the rotor includes bars which are exposed at a periphery of the rotor.

3. The machine of claim 1 wherein the exterior diameter of the 36 slot stator is about 120 millimeters, wherein the interior diameter is about 78 mm and wherein the stator has a height of about 40 millimeters.

4. The machine of claim 1 wherein the ratio of the interior diameter to the minimum exterior diameter is greater than or equal to 0:63:1 such that the motor has reduced materials, reduced temperature of operation and lower current than a 24 slot 2 pole motor having a size of about 132 mm in diameter and about 60 mm in height.

5. The machine of claim 1 wherein the motor comprises at least one of a controlled induction motor (CIM) or an internal permanent magnet (IPM) motor.

6. The machine of claim 1 wherein the stator has aluminum windings.

7. The machine of claim 1 further comprising a drive control connected to the motor for energizing the motor during a spin cycle to rotate the rotor at a speed of at least 14000 rpms and for energizing the motor during a wash cycle to rotate the rotor at a speed of less than 600 rpms.

8. The machine of claim 1 further comprising a drive control for a 2 pole 24 slot motor having a different frequency of operation, said drive control connected to the motor for energizing said motor.

9. A motor comprising:
A 4 pole rotor including bars which are exposed at a periphery of the rotor;
A 36 slot stator receiving the 4 pole rotor wherein the stator with the received rotor are capable of operating a flux weakening range of at least 5:1 thereby configuring the motor having reduced materials, reduced temperature of operation at lower speeds and lower current than a motor having a ratio of an interior diameter to an exterior diameter of less than 0.63:1.

10. The motor of claim 9 further comprising a clothing receptacle of a washing machine, said clothing receptacle driven by the rotor on a horizontal axis.

11. The motor of claim 9 wherein the 36 slot stator has an interior bore with an interior diameter, said interior bore receiving the 4 pole rotor in magnetic coupling relation to the 36 slot stator, said stator having an exterior perimeter with a minimum exterior diameter wherein a ratio of the interior diameter to the minimum exterior diameter is greater than or equal to 0.63:1.

12. The motor of claim 9 wherein the motor is at least one of a controlled induction motor (CIM) or an internal permanent magnet (IPM) motor.

13. The motor of claim 12 wherein the stator has aluminum windings.

14. The motor of claim 9 wherein the stator has aluminum windings.

15. The motor of claim 9 further comprising a drive control connected to the motor for energizing the motor during a spin cycle to rotate the rotor at a speed of at least 14000 rpms and for energizing the motor during a wash cycle to rotate the rotor at a speed of less than 600 rpms.

16. A motor comprising:
A 4 pole rotor;
A 36 slot stator having an interior bore with an interior diameter, said interior bore receiving the 4 pole rotor in magnetic coupling relation to the 36 slot stator, said stator having an exterior perimeter with a minimum exterior diameter wherein a ratio of the interior diameter to the minimum exterior diameter is about 0.63:1 or greater wherein the motor is capable of operating in a flux weakening range of at least 5:1 thereby configuring the motor having reduced materials, reduced temperature of operation at lower speeds and lower current than a motor having a ratio of an interior diameter to an exterior diameter of less than 0.63:1.

17. The motor of claim 16 further comprising a clothing receptacle of a washing machine, said clothing receptacle driven by the rotor on a horizontal axis.

18. The motor of claim 17 wherein the rotor includes bars which are exposed at a periphery of the rotor.

19. The motor of claim 18 wherein the motor is at least one of a controlled induction motor (CIM) or an internal permanent magnet (IPM) motor.

20. The motor of claim 19 wherein the stator has aluminum windings.

21. The motor of claim 16 further comprising a drive control connected to the motor for energizing the motor during a spin cycle to rotate the rotor at a speed of at least 14000 rpms and for energizing the motor during a wash cycle to rotate the rotor at a speed of less than 600 rpms.

* * * * *